Figure 1:

J. B. HALL.
PROCESS FOR MATURING IMMATURE AND FROST BITTEN COTTON BOLLS.
APPLICATION FILED OCT. 24, 1912. RENEWED MAR. 2, 1914.

1,110,928.  Patented Sept. 15, 1914.

WITNESSES
P. F. Nagle
L. Couville

INVENTOR
John B. Hall
BY Wiederheim Fairbanks
ATTORNEYS

UNITED STATES PATENT OFFICE.

JOHN B. HALL, OF PHILADELPHIA, PENNSYLVANIA.

PROCESS FOR MATURING IMMATURE AND FROST-BITTEN COTTON-BOLLS.

1,110,928.   Specification of Letters Patent.   Patented Sept. 15, 1914.

Application filed October 24, 1912, Serial No. 727,499. Renewed March 2, 1914. Serial No. 822,075.

*To all whom it may concern:*

Be it known that I, JOHN B. HALL, a citizen of the United States, residing in the city and county of Philadelphia, State of Pennsylvania, have invented a new and useful Process for Maturing Immature and Frost-Bitten Cotton-Bolls, of which the following is a specification.

In the art of cotton production, where the growth is heavy or where a late maturing variety has been planted, a considerable proportion of the cotton bolls fail to open, especially if frost comes early in the fall, since any condition or factor that tends to promote the growth of cotton, such as a rich soil or high fertilization or plenty of moisture in the soil tends to promote an unduly late growth of cotton, and under these conditions, it is liable to be caught by frost and a large number of the bolls fail to open. Under present conditions, these cotton bolls have no commercial value whatever, since as at present utilized, their only value is when plowed under in sufficient quantities, they act to fertilize the soil, if there are very many on the land. These immature cotton bolls being filled with cotton, it is evident that in case of an early frost or in case of the crop being late, there is liable to be an enormous loss to the planter, since the bolls are commonly permitted to go to waste on the cotton plants or stalks or on the ground, no attempt having been heretofore made, so far as I am aware, to chemically treat said bolls so as to cause the pods to open, and thus enable the cotton to be removed therefrom for subsequent treatment in the usual way. Under these conditions, there is not only a great loss to the planter of all the cotton, which is contained in or may be obtained from these immature and frost bitten bolls, by my novel process to be hereafter described, but there is also afforded an opportunity for the destructive pest called the cotton boll-weevil to propagate in said immatured or frost bitten bolls and extend its destructive area from State to State of the present cotton belt, it having been variously estimated that the percentage of loss to the South from frost bitten and immature cotton bolls runs up into many million dollars annually, while the loss from the ravages of the cotton boll-weevil last year alone was estimated by the Government authorities at fifty million dollars, and is constantly increasing.

My present invention relates to a novel process for artificially maturing frost bitten and immature cotton bolls, whereby I am enabled to take all of these heretofore useless and apparently dead, frost bitten or immature cotton bolls and treat the same so that said bolls or pods open in a short period of time subsequent to my novel treatment either on the stalk or off the stalk, thereby enabling the cotton contained therein to be readily removed for the purpose of ginning or subsequent treatment, my novel invention not only resulting in reclaiming for the cotton planter a large proportion of a most valuable article of commerce, that is now allowed to go absolutely to waste, but, in addition, by my process, I assist to exterminate the destructive pest known as the cotton boll-weevil since by utilizing the immature or frost bitten bolls and the cotton contained therein as hereafter set forth, I destroy or remove to a great extent the opportunity for said weevil to propagate therein, and I am also enabled to increase the production of an important staple article, which is constantly increasing in value and demand. Furthermore, by the employment of my process, the North, East and West, in addition to the South, can now economically and safely raise cotton, because by my process a planter is enabled to mature the cotton from the immature boll, since the disadvantages of a cold climate or a short season are entirely obviated, as I do not need a long season to mature the bolls, as is now necessary. Furthermore, it will be seen that by the employment of my process, countless abandoned farms in the North, East and West can be made now available to be at once planted with cotton and given over to this product, which is much more valuable and profitable than wheat, corn or rye, which has been estimated to cost from seven to thirty times the amount of fertilizer and other expenses, as compared with cotton.

The ingredients employed in carrying out my process are very cheap and inexpensive chemicals, which are within the reach of anyone, and so inexpensive that any planter or anyone else interested in the cotton industry can readily procure and apply the same in carrying out my method, since in carrying out the steps of my process, the cotton bolls can either be treated under certain conditions and matured directly on the stalks themselves, or they can be preferably cut down with scythes or any other sharp implement or preferably mechanically stripped from their stalks while in immature condition, thus saving the present expensive and slow process of picking out only the ripe bolls, whereby I am enabled to use any and all bolls and therefore all the bolls immature or matured on a cotton stalk plant can be quickly and expeditiously gathered at the same time, and the immature bolls subsequently and expeditiously treated by my novel process.

In carrying out the novel steps of my improved process, I apply to the cotton bolls a maturing chemical composition which is used in a dry state, is non-explosive, non-poisonous, harmless in every way and can be cheaply procured.

To the above ends, my invention consists of a novel process of treating immature or frost bitten cotton bolls, whereby I produce artificially a matured condition, which would be produced by nature, if all atmospheric and climatic conditions were perfect or favorable, and I further eliminate the opportunity for the existence or propagation of the destructive pest known as the cotton boll-weevil.

To the above ends, my invention consists of a novel process for treating immature or frost bitten cotton bolls.

It also consists of a novel composition of matter to be applied to such bolls.

For the purpose of illustrating my invention, I have shown one form of apparatus, wherein the steps of the same may be carried out, but it will be understood that the maturing composition may be applied in a different manner and different mechanisms from that shown may be employed, and I do not therefore desire to be limited to any particular mechanism for carrying out the steps of my invention, and furthermore, the proportions of the ingredients employed for the maturing composition may be varied according to requirements or to atmospheric or climatic conditions.

Figure 2:
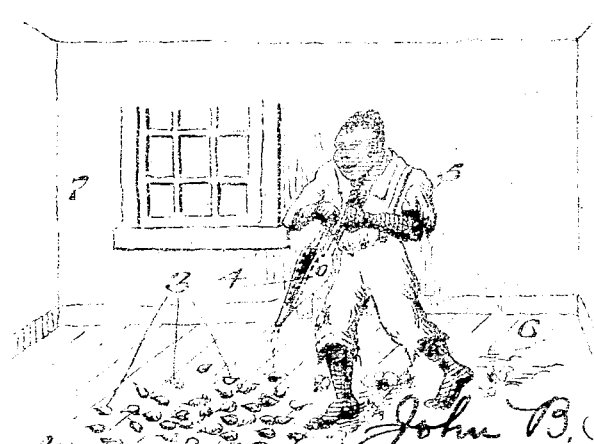

Figure 1 represents a perspective view of one manner of carrying out the novel steps of my process for maturing immature or frost bitten cotton bolls, while the same are on the stalk. Fig. 2 represents a perspective view of another form of mechanism for carrying out the steps of my novel process showing the immature cotton bolls gathered upon the floor of a suitable building or outhouse and being treated therein.

Similar numerals of reference indicate corresponding parts in the figures.

Referring to the drawings: In carrying out the steps of my novel process, I employ a suitable maturing material or composition, which I have found in practice to produce the most efficient results and in the simplest embodiment of my process, I place the maturing powder or composition in a suitable hand-operated bellows, whereby the powder may be applied to the cotton boll, either on the stalk or when removed from the stalk and gathered within a suitable building.

In the preferred embodiment of my invention, I produce the maturing composition by commingling talcum, starch and a suitable granular detritus with a texture coarser than clay and finer than gravel, said parts being commingled in substantially the following proportions,—one-quarter talcum, one-half starch, and one-quarter granular detritus with a texture coarser than clay and finer than gravel. If desired, the granular detritus may be omitted from the composition and the talcum and starch only employed, their proportions being slightly increased or diminished according to requirements or according to atmospheric or climatic conditions. I have found that by applying this maturing composition to the cotton bolls, either on or off the stalk at repeated intervals during a short period, that within said period the immature or frost bitten bolls will open, and the cotton can then be readily removed therefrom in the usual way and prepared for subsequent treatment in a cotton gin or other mechanism.

In Fig. 1 of the drawings, 1 designates a cotton plant, 2 an open boll, and 3 the closed or immature or frost bitten bolls.

4 designates the bellows, which is adapted to be loaded with the maturing composition, composed of talcum, starch and granular detritus with a texture coarser than clay and finer than gravel, said bellows being adapted to be actuated by the hands of the operator 5.

In Fig. 1, I have shown the operator as applying the maturing composition directly to the immature or frost bitten bolls 3, while on the stalk, while in Fig. 2, I have shown the operator as applying the maturing composition to the immature or frost bitten bolls 3 which have been gathered or stripped from their stalks in any suitable manner and placed upon the floor 6 of a suitable apartment, warehouse or outhouse 7.

It will be understood that the novel steps of my invention in its simplest embodiment may be carried out, as illustrated in Figs. 1 and 2, wherein I have shown a hand-operated bellows discharging the maturing composition directly upon the immature or frost bitten bolls, but it will be apparent that where it is desired to carry out my invention on a larger scale, I may employ any suitable kind of a rotary or other fan or pneumatic blowing apparatus having an inlet for the maturing composition and an outlet pipe, whereby the maturing composition may be discharged in the desired direction upon or against the immature or frost bitten cotton bolls. The result of directing or impelling the maturing composition against or upon the immature or frost bitten bolls is to cause the same to adhere thereto and by reason of the nature of said maturing composition, the immature bolls open, and I thus produce artificially a condition of fruition, which would be produced by nature under perfect climatic or atmospheric conditions. It will be understood by those skilled in this art that the immature or frost bitten bolls, which I treat by my novel process in the manner described, ordinarily initially contain a slight amount of natural moisture, and that in practice the initial action of the chemicals, which I employ is to slightly contract the fiber of the outer shell portion of the boll, whereupon said shell members which are usually from three to five in number open and at substantially the same time or immediately subsequently thereto, the fibers of the cotton expand into a matured state, it being understood that the extraction of said moisture preferably takes place gradually, as does the operation of contracting the shell of said boll, and the opening of the latter and the expanding of the fibers of the cotton into a natural state, the entire operation of carrying out the steps of my novel process occupying in practice but a short period of time. I am therefore enabled by my novel method to utilize all the frost bitten or immature cotton bolls, which under present conditions are allowed to dry upon the stalks or fall to the ground and afford a home or place of lodgment for the boll-weevil and its larva, and I am further enabled by my process of utilizing immature or frost bitten cotton bolls, which have heretofore not been utilized, to eliminate the destructive pest of the boll-weevil, and I am in addition enabled not only to utilize frost bitten and immature cotton bolls, but also the cotton and cotton seeds therein, which have heretofore been wasted and not utilized. The seeds of the immature or frost bitten cotton bolls which have heretofore gone to waste are, according to chemical tests which I have had made, as well adapted for cotton seed oil as the seed of bolls matured in the usual way, except that there is a slightly less production of oil to the bushel, as compared to the oil production from seeds of the matured bolls. The lintel or celluloid or smokeless powder products obtained from the immature bolls treated by my process is equally as valuable as that from the matured bolls, and by the use of these by-products, celluloid and cotton seed oil can be made in much greater and cheaper quantities than heretofore, as well as cotton oil butter, whose cost of production may be greatly cheapened for the public, and the basis for smokeless powder is greatly increased, so that in case of a prolonged war, an indefinitely greater supply would be on hand ready for emergency than has heretofore been the case.

In carrying out my invention, I use the chemicals employed in a dry state and as the same are non-explosive and non-poisonous, they are harmless in every way and can be very cheaply procured in quantities. I do not desire to be limited to any particular mechanism for carrying out the steps of my novel process, as the same may be applied by hand or by pneumatic or other machinery, and it is also understood that the proportions of the ingredients of my maturing composition employed, may be varied according to requirements or to atmospheric or climatic conditions, and, if desired, the granular detritus I employ can be omitted or its proportions varied according to requirements or climatic or atmospheric conditions aforesaid.

So far as I am aware, I am the first in the art to artificially open cotton bolls or the like and mature the cotton fibers therein or to cause said fibers to approach a natural or matured condition by the application of a suitable chemical or other maturing agent and my claims to the process herein above set forth in their broad aspects are to be construed with the corresponding scope accorded to a pioneer invention and are not limited in their broad aspects to any particular chemical or any particular artificial or other maturing agent.

Having thus described my invention, what I claim as new, and desire to secure by Letters Patent, is:—

1. The herein described process of maturing immature or frost bitten cotton bolls, which consists in artificially contracting the fiber of the shell of a cotton boll, and next expanding the fibers of the cotton contained therein into a natural state.

2. The process of maturing immature or frost bitten cotton bolls, which consists in artificially applying to a cotton boll, a moisture absorbing composition, contracting the fiber of the shell of said boll, and lastly expanding the fibers of the cotton contained therein into a mature state.

3. The herein described process of maturing immature or frost bitten cotton bolls, which consists in applying to such bolls a maturing composition, composed of talcum and starch, said composition being adapted to adhere to said bolls and cause the same to artificially mature and open.

4. The herein described process of maturing immature or frost-bitten cotton bolls, which consists in applying to such bolls a maturing composition composed of talcum, starch and a granular detritus with texture coarser than clay and finer than gravel, said composition being adapted to adhere to said bolls and to cause the same to artificially mature and open.

5. The process of maturing immature or frost bitten cotton bolls, which consists in artificially and gradually contracting the exterior of the boll, so as to open the same, and simultaneously expanding the fibers of the cotton into their natural or matured condition.

6. The process of maturing immature cotton bolls, consisting in artificially opening out the shell of the boll and gradually expanding the fibers of the immature cotton to induce a matured state of said fibers.

7. The herein described process of maturing immature or frost bitten bolls, consisting in applying a chemical agent to the surface of the boll to gradually curl open the exterior of the boll and simultaneously expand the cotton fibers to induce the matured state of said fibers.

8. The herein described process of maturing immature or frost bitten, detached, cotton bolls, which consists in artificially contracting the outer fibers of the shell of a cotton boll and expanding the fibers of the cotton contained therein into a natural or matured state.

JOHN B. HALL.

Witnesses:
E. HAYWARD FAIRBANKS,
FRED. D. MAISCH.